United States Patent
von Fischern et al.

[15] 3,690,751
[45] Sept. 12, 1972

[54] PROJECTOR FOR USE WITH CASSETTES FOR MOTION PICTURE FILM

[72] Inventors: Bernhard von Fischern; Alfred Winkler; Klaus Fuchsle, all of Munich; Johann Zanner, Jr.; Peter Ungnadner, both of Unterhaching, all of Germany

[73] Assignee: Agfa-Gevaert Aktiengesellschaft, Leverkusen, Germany

[22] Filed: Dec. 18, 1970

[21] Appl. No.: 99,569

[30] Foreign Application Priority Data

Dec. 23, 1969    Germany..........P 19 64 727.9

[52] U.S. Cl. ..................352/125, 242/181, 242/197, 352/72, 352/92
[51] Int. Cl......G03b 1/58, G03b 21/02, G03b 21/52
[58] Field of Search..........352/72, 78, 123, 124, 125, 352/92; 242/180, 181, 197

[56] References Cited

UNITED STATES PATENTS

| 3,386,674 | 6/1968 | Guernet.....................242/181 |
| 3,550,879 | 12/1970 | Bundschuh et al..........353/72 |
| 3,301,628 | 1/1967 | Hellmund..............3532/92 X |
| 3,578,852 | 5/1971 | Aldridge.......................352/92 |
| 3,540,803 | 11/1970 | Thevenaz...................352/125 |
| 3,342,541 | 9/1967 | Mouissie et al........352/125 X |
| 3,561,853 | 2/1971 | Thevenaz..............352/125 X |

*Primary Examiner*—Joseph F. Peters
*Attorney*—Michael S. Striker

[57] ABSTRACT

A motion picture projector for use with magazines containing stacks of cassettes for motion picture film. The housing of the projector supports two coaxial takeup reels one of which assumes a collecting position and collects the film which is being withdrawn from a cassette in a projection position while the other takeup reel assumes a withdrawing position and pays out the film whose presentation is completed and which is being returned to the corresponding cassette. The takeup reels are caused to change positions in response to detection of the trailing portion of the film which is being presented, and such change in positions of the takeup reels take place simultaneously with a stepwise advance of the magazine so as to place a fresh cassette into the projection position while the preceding cassette assumes a position in which a rewinding mechanism rewinds onto its supply reel that film which is stored on the core of the takeup reel occupying the withdrawing position.

26 Claims, 6 Drawing Figures

INVENTOR
BERNHARD von FISCHERN
ALFRED WINKLER
KLAUS FÜCHSLE
JOHANN ZANNER, JR
PETER UNGNADNER

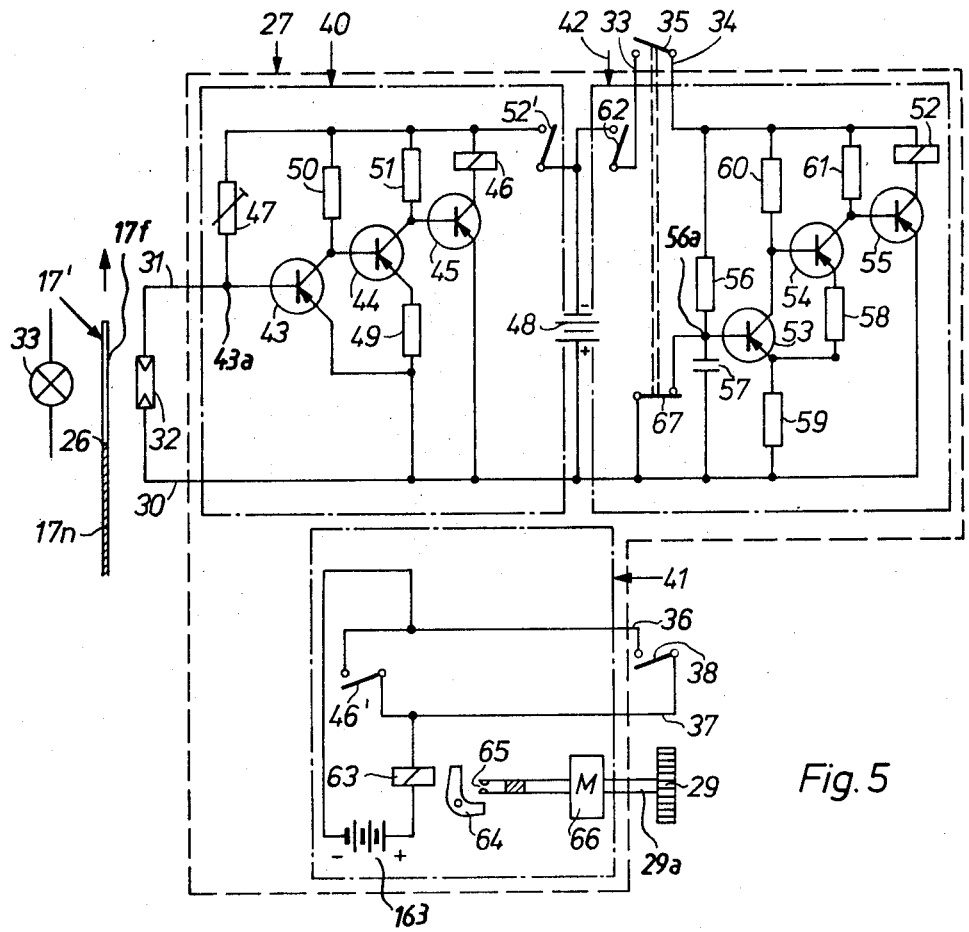
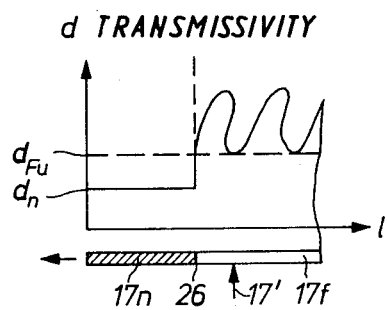
Fig. 5
Fig. 6
INVENTOR
BERNHARD von FISCHERN
ALFRED WINKLER
KLAUS FÜCHSLE
JOHANN ZANNER
PETER UNGNADNER

PROJECTOR FOR USE WITH CASSETTES FOR MOTION PICTURE FILM

BACKGROUND OF THE INVENTION

The present invention relates to cinematographic apparatus in general, and more particularly to improvements in motion picture projectors. Still more particularly, the invention relates to improvements in projectors which utilize cassettes or analogous containers for motion picture film.

It is already known to provide a motion picture projector with two takeup reels one of which collects that film whose images are being projected onto a screen while the other reel pays out the previously presented film. The projector includes a switching or direction changing device having an inlet and two outlets each serving to direct film toward one of the takeup reels. It was found that such projectors are quite complicated and prone to malfunction. Moreover, they cannot support more than two rolls of motion picture film at a time.

SUMMARY OF THE INVENTION

An object of the invention is to provide a motion picture projector wherein the images of frames on two or more rolls of film can be projected onto a screen practically without interruptions.

Another object of the invention is to provide a motion picture projector which automatically threads the leading portions of successive rolls of film and automatically rewinds successive rolls of film upon completion of projection of their images.

A further object of the invention is to provide a projector wherein any desired number (within practical limits) of rolls of motion picture film can be presented in such a way that an observer can hardly notice the transition between presentations of successive rolls.

An additional object of the invention is to provide a projector of the above outlined character with novel and improved means for rewinding a roll film whose presentation has been completed during presentation of the next-following film so that the rewinding is completed not later than at the time when the presentation of the next-following film is completed.

Still another object of the invention is to provide novel means for automatically expelling a first motion picture film from the film path which extends behind the projection lens system when the presentation of images of satisfactory frames on the film is completed.

An additional object of the invention is to provide a projector which embodies means for automatically initiating the rewinding of successive rolls of film as soon as the satisfactory frames of the film are moved beyond the projection gate.

The projector of the present invention is intended for use with cassettes or containers for convoluted motion picture film and comprises a housing, guide means mounted in and/or on the housing and defining a film path along which the film which is stored on the supply reel of a cassette which occupies a predetermined projection position is arranged to move lengthwise, a pair of takeup reels rotatably mounted in or on the housing so that one reel occupies a film collecting position in which it can collect the film advancing along the film path and that the other reel occupies a film withdrawing position in which the film which is convoluted on its core can be withdrawn to be collected on the supply reel of a cassette occupying a predetermined rewinding position, and control means for inverting the takeup reels so as to respectively place the one and the other takeup reel into the withdrawing and collecting position.

The control means can be operated by a drive which is responsive to signals produced by a scanning device adjacent to the film path and serving to initiate the operation of the drive means is response to detection of the trailing portion of that film which is being advanced along the film path. A rewinding mechanism automatically rewinds the film from the takeup reel occupying the withdrawing position onto the supply reel of the corresponding cassette (in the rewinding position) while the images of frames of the film moving along the film path are being projected onto a screen.

The novel features which are considered as characteristic of the invention are set forth in particular in the appended claims.

The improved projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a diagrammatic view of the electric circuitry in a drive which forms part of the projector shown in FIG. 4; and FIG. 6 is a diagram illustrating the light transmissivity of various portions of motion picture film which is used in the improved projector.

DESCRIPTION OF THE PREFERRED EMBODIMENTS

Figure 1:
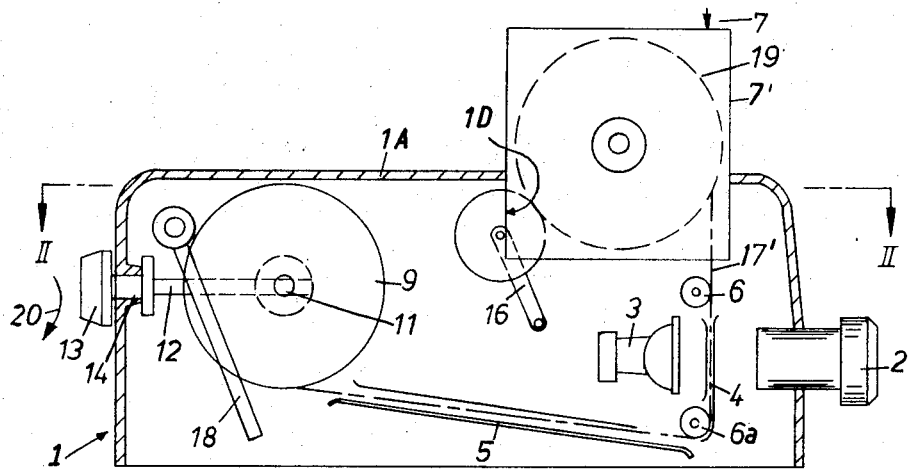
FIG. 1 is a fragmentary diagrammatic longitudinal vertical sectional view of a motion picture projector which embodies one form of the invention.
Figure 2:
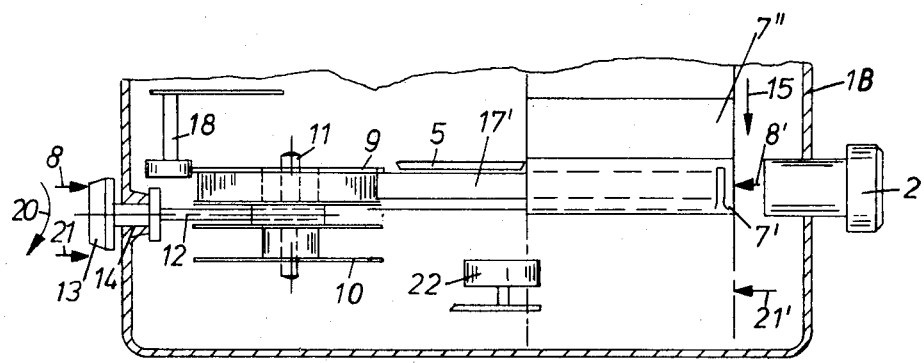
FIG. 2 is a horizontal sectional view as seen in the direction of arrows from the line II—II of FIG. 1.
Figure 3:
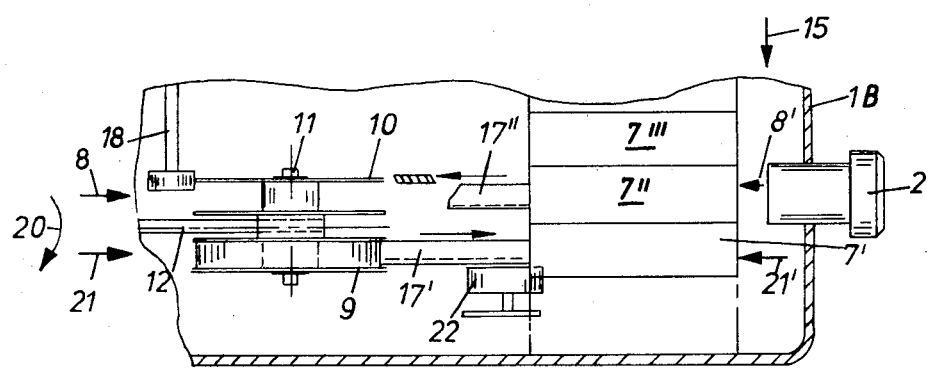
FIG. 3 illustrates the structure of FIG. 2 but with the takeup reels in inverted position.

FIGS. 1 to 3 illustrate a portion of a motion picture projector having a housing 1 provided with a top wall 1A having a transversely extending channel 1D for a magazine (not shown) containing a stack of parallel containers or cassettes 7 for motion picture film. The manner in which the magazine is moved in stepwise fashion will be described in connection with FIGS. 4 to 6. The purpose of the projector is to enable the operator to project the images of frames on successive rolls of film (namely, the images of frames on films which are stored in successive cassettes) practically without any interruptions. This is achieved by moving the first or foremost cassette 7' from a projection position 8' to a rewinding or film collecting position 21' as soon as the projection of images of frames on film which is stored in the foremost cassette 7' is completed, and by simultaneously moving the next following or second cassette 7'' to the projection position 8'. Thus, the film 17' which is stored in the foremost cassette 7' is being rewound onto the supply reel 19' in such foremost cassette while the images of frames of film 17'' in the second cassette 7'' are being projected onto a screen or the like.

The front wall 1B of the housing 1 supports a projection lens system 2 located in front of a light source 3 which directs a beam of light against the lens system whereby the light passes through the frames of that film which is being drawn from the cassette which is held in the projection position 8'. The housing 1 supports a gate 4 which is located between the lens system 2 and the light source 3 and along which the film is moved in stepwise fashion by a customary claw pull-down, not shown. The film which is being drawn from the supply reel in the cassette which is held in the projection position 8' must be threaded along a predetermined path which extends along a first or upper guide roll 6, past the gate 4 (i.e., in the space between the lens system 2 and light source 3), along a second or lower guide roll 6a, through a suitably configured guide channel 5 and on to the core of one of two coaxial takeup reels 9, 10 which are mounted on a common spindle 11. FIGS. 1 and 2 show that the foremost cassette 7' is located in the projection position 8' and that the film 17' is threaded from the supply reel 19' in the cassette 7', along the aforementioned path, and is automatically coupled to the core of the takeup reel 9 which occupies a film collecting position 8. The spindle 11 for the takeup reels 9, 10 is secured to a control shaft 12 whose axis is normal to the common axis of the takeup reels 9, 10 and which is rotatable in a bearing 14 provided therefor in the housing 1. The outer end portion of the control shaft 12 extends beyond the bearing 14 and is provided with a manually operable actuating member here shown as a knob 13. The direction in which the stack of cassettes 7 is to be moved in stepwise fashion in order to place successive cassettes into the projection position 8' is indicated by an arrow 15. The axis of the shaft 12 is normal to the axes of supply reels in cassettes which occupy the projection and rewinding positions.

The projector further comprises a conventional automatic film threading mechanism 16 which can enter that cassette which is held in the projection position 8' to rotate the supply reel in a direction to pay out the film. The mechanism 16 serves to thread the leading portion of the film along the aforementioned path, at least until the perforations of the film can be engaged by the pull-down which thereupon continues to transport the leading portion toward and into engagement with the core of the takeup reel 9 or 10, namely, of that takeup reel which is held in the collecting position 8. The projector also comprises a film transporting mechanism 18 which includes one or more friction wheels and serves to rotate that takeup reel (9 in FIG. 2) which is held in the collecting position 8. When the film 17' is fully convoluted on the core of the takeup reel 9, the tension of the trailing portion of such film increases in response to continued rotation of the reel 9 and initiates a deactivation of the transporting mechanism 18 in a manner not forming part of the present invention. It will be noted that, when held in the film collecting position 8, the takeup reel 9 is at least substantially coplanar with the supply reel (19') in that cassette (7') which is maintained in the projection position 8'.

The arrow 20 indicates the direction in which the knob 13 can be rotated by hand in order to invert the takeup reels 9, 10 so that the reel 9 occupies the space previously occupied by the reel 10, and vice versa. Thus, the knob 13 can be manipulated to rotate the takeup reels 9, 10 through 180 degrees about the axis of the control shaft 12 so that the reel 10 assumes the film collecting position 8 while the reel 9 assumes a film withdrawing position 21. At the same time, the corresponding (foremost) cassette 7' is moved to the film collecting or rewinding position 21' and the next- following cassette 7'' is moved to the projection position 8'. The film 17' is withdrawn sideways from the aforementioned path (i.e., also from the guide channel 5) in response to rotation of the knob 13 through 180° so that the leading portion of the film 17'' (in the cassette 7'' can be threaded along the path and connected to the core of the takeup reel 10. FIG. 3 shows the cassette 7'' in the projection position 8' and the takeup reel 10 in the film collecting position 8.

The rewinding of film 17' onto the supply reel 19' in the foremost cassette 7' (in the rewinding or collecting position 21') takes place while the film 17'' is being paid out by the supply reel in the cassette 7'' (in the projection position 8') to be collected by the takeup reel 10 (in the collecting position 8). An automatic rewinding mechanism is shown at 22; it can extend into the interior of the cassette 7' from below to rotate the flange or flanges of the supply reel 19' or the outermost convolution of film 17' on the core of the reel 19'. The film 17' which was twisted in response to rotation of the control shaft 12 through 180° (namely, during movement of the takeup reel 9 to the film withdrawing position 21 of FIG. 3) is untwisted during transport toward the core of the supply reel 19' in the cassette 7'. Such untwisting can be effected by the guide rolls 6. The leading end of the film 17' is automatically detached from the core of the takeup reel 9 and is returned into the interior of the cassette 7' before the stack of cassettes 7 is moved by a step (arrow 15) in order to place the third cassette 7''' into the projection position 8' simultaneously with renewed turning of the shaft 12 through 180° so as to return the takeup reels 9, 10 to the positions shown in FIG. 2. The film which is stored in the cassette 7''' is thereupon drawn toward and attached to the core of the takeup reel 9 while the rewinding mechanism 22 causes the film 17'' to be convoluted onto the core of the supply reel in the cassette 7'' (which then occupies the rewinding position 21'). The same procedure is repeated again and again until the last or rearmost cassette moves to the position 21' so that the film can be returned into such rearmost cassette by means of the rewinding mechanism 22.

Figure 4:
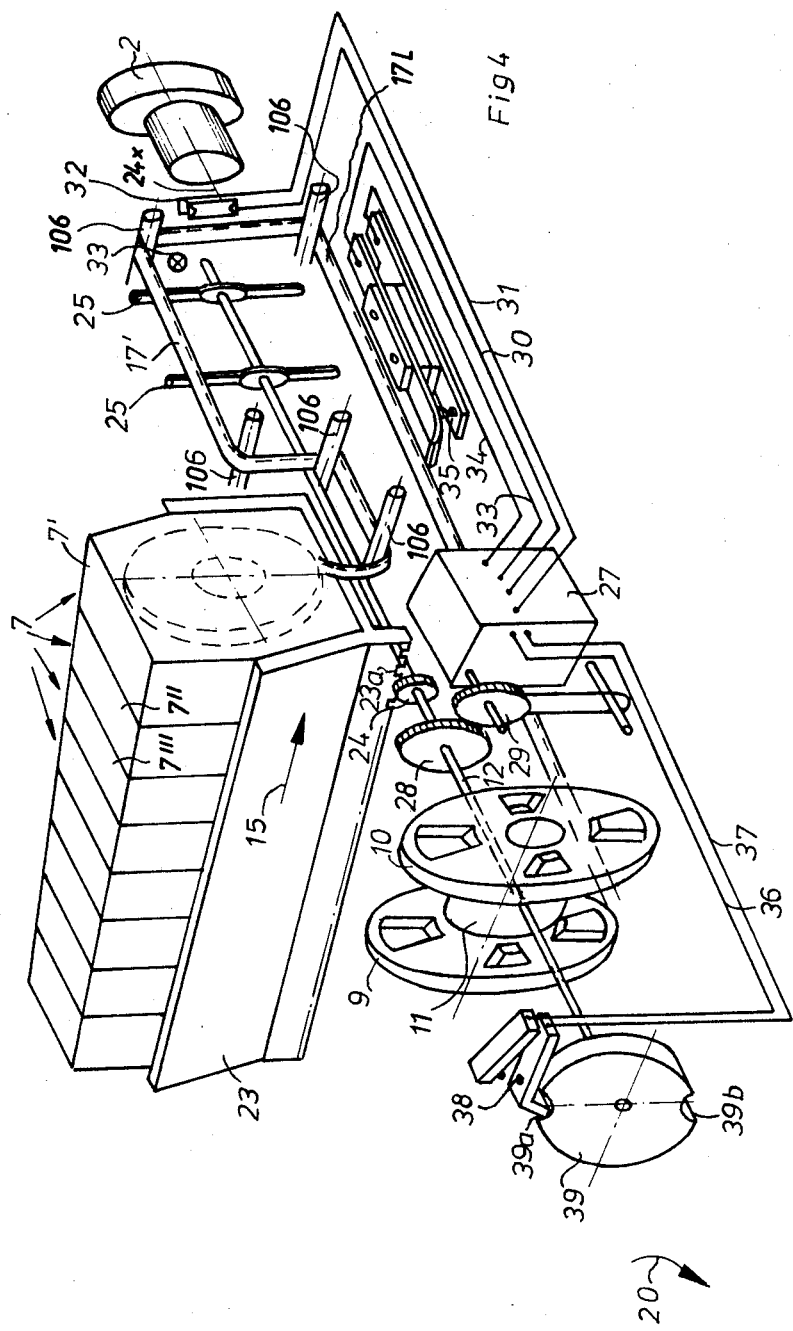
FIG. 4 is a fragmentary perspective view of a second projector.

FIG. 4 illustrates a portion of a motion picture projector which differs from the projector of FIGS. 1 to 3 mainly in that the control shaft 12 need not be rotated by hand and that the projector comprises an advancing mechanism which can automatically advance the stack of cassettes 7 by a step as soon as the main portion of a film (namely, that portion which carries satisfactory frames) has been advanced beyond the gate (not shown in FIG. 4).

The cassettes 7 are stacked in a suitable trough-shaped magazine or tray 23 which can be inserted into a transversely extending guide channel (not shown) provided in the top wall of the projector housing (see the channel 1D in the top wall 1A of the housing 1 shown in FIG. 1). The longitudinal direction of the properly inserted tray 23 is normal to the optical axis 24x of the lens system 2. The control shaft 12 is rotatably mounted in the housing of the projector and is rigidly connected with a driving portion or pinion 24 which mates with a driven portion or toothed rack 23a on the bottom part of the tray 23 not later than when the foremost cassette 7' reaches the projection position. When the control shaft 12 is rotated through 180° (arrow 20), the pinion 24 automatically advances the tray 23 by a step so that the foremost cassette 7' is moved to the rewinding or film collecting position and that the next-following cassette 7'' is moved to the projection position. FIG. 4 illustrates the foremost cassette 7' in the projection position and the leading portion 17L of the film 17' is about to reach the core of the takeup reel 9. The film 17' is threaded along a path which is defined in part by five relatively long rod-shaped guide rolls 106. The gate (not shown) is disposed between the two rightmost guide rolls 106 so that the film frame which registers with the gate is behind the lens system 2 and its image can be projected onto a screen, not shown. The gate, the guide channel and certain other parts of the projector are omitted in FIG. 4 for the sake of clarity.

The control shaft 12 carries blade- or paddle-like film shifting devices 25 which can move the film 17' sideways out of the film path in response to rotation of the control shaft 12 through 180 degrees at the time when the tray 23 is being advanced by a step. Thus, the expulsion of film 17' from the path takes place simultaneously with rotation of the takeup reels 9, 10 through 180° and simultaneously with movement of the corresponding cassette (7') from the projection position to the rewinding position.

The films which are stored in the cassettes 7', 7'', 7''' . . . of the tray 23 have leading portions 17L (FIG. 4), main portions 17f and trailing portions 17n (shown in FIGS. 5 and 6). The light transmissivity dn of the trailing portion 17n is less than the minimum light transmissivity dFu of the main portion 17f (this main portion has frames whose images are to be projected onto the screen). The length of each trailing portion 17n must be selected in such a way that its front end can reach the region of the gate and lens system 2 before the corresponding film (17' in FIGS. 4 to 6) is completely unwound from the core of the supply reel 19' in the corresponding cassette 7'. The differences in light transmissivity of the film portions 17f, 17n are utilized to initiate automatic rewinding of the film 17' onto the supply reel 19' as well as an automatic stepwise advance of the magazine 23 and automatic inversion of the takeup reels 9, 10. In the diagram of FIG. 6, the light transmissivity $d$ of the film portions 17f, 17n is measured along the ordinate and the length $l$ of the film is measured along the abscissa. The curve shown in FIG. 6 represents the fluctuations in light transmissivity of the main film portion 15f; the broken line dFu represents the minimum light transmissivity of the main portion 17f which is assumed to at least slightly exceed the light transmissivity dn of the trailing portion 17n. The point of transition or junction between the film portions 17f, 17n is indicated by the reference character 26.

The film (17') which is being drawn from the cassette (7') held in the projection position is tracked by a scanning element here shown as a photoelectric receiver 32 which is preferably mounted in front of the film path close to the lens system 2 and in registry with a light source 33 serving to direct against the photosensitive surface of the receiver 32 a beam of light which must pass through the adjacent portion of the film 17' before it can reach the receiver 32. The latter is preferably a photoelectric resistor. The light source 33 can be provided for the sole purpose of directing a light beam toward the receiver 32 or it can constitute the light source (see the part 3 in FIG. 1) which directs light through the projection lens system 2. In the latter instance, the means for directing a beam of light toward the photosensitive receiver 32 may comprise a customary light conducting bar (not shown) which directs some of the light issuing from the projection light source (normally a strong lamp located in front of a suitable reflector).

The receiver 32 scans successive increments of the travelling film 17' and transmits suitable signals to the input of an electromechanical drive 27 which is connected with the receiver 32 by conductors 30, 31. The drive 27 includes an output circuit 41 having a transmission with a shaft 29 $a$ for a gear 29 which meshes with a gear 28 on the control shaft 12. The signal which is transmitted by the receiver 32 when the latter detects the junction 26 between the film portions 17f, 17n causes the drive 27 to rotate the gear 28 by way of the gear 29 so that the control shaft 12 is rotated through 180° (arrow 20). This causes the takeup reels 9, 10 to change positions while the shifting elements 25 move the film 17' (namely, the trailing portion 17n) away from the film path and the pinion 24 advances the tray 23 by a step so as to place the cassette 7' into the rewinding position while the next-following cassette 7'' assumes the projection position. The receiver 32 is preferably mounted in front of or close to the gate.

The drive 27 is connected with a detector 35 by means of conductors 33, 34. The detector 35 is an electric switch which is adjacent to the film path and is closed when the film (e.g., the film 17') is properly threaded through the projector. For example, the detector switch 35 can be installed in the guide channel corresponding to the part 5 shown in FIGS. 1 and 2. Conductors 36, 37 connect the drive 27 with a normally open cam-operated switch 38 which is adjacent to a disk-shaped cam 39 on the control shaft 12. The peripheral surface of the cam 39 is provided with two notches 39a, 39b which are located diametrically opposite each other and each of which permits opening of the switch 38 in response to rotation of the control shaft 12 through 180°.

The electric circuitry of the drive 27 is illustrated in FIG. 5. This circuitry includes the aforementioned output circuit 41, an electronic control circuit 40 whose input is connected with the photosensitive receiver 32 by the conductors 30, 31, and an electronic delay circuit 42. The circuit 40 controls the output circuit 41, and the delay circuit 42 serves to connect the control circuit 40 with an energy source 48. The control circuit 40 includes a switching stage having three transistors 43, 44, 45. The base of the transistor 43 is connected with the receiver 32 (by way of the conductor 31) and with a variable resistor 47. The collector of the transistor 45 is connected with an actuating electromagnet 46 which controls a switch 46' in the output circuit 41. The variable resistor 47 is in series with the receiver 32 and the base of the transistor 43 is connected to a tap 43a between the parts 32, 47. The emitter of the transistor 43 is connected with the positive pole of the energy source 48 and with the emitter of the transistor 44 (by way of a resistor 49). The collector of the transistor 43 is connected with a resistor 50 and with the base of the transistor 44. The collector of the transistor 44 is connected with a resistor 51 and with the base of the transistor 45. The emitter of the transistor 45 is connected with the positive pole of the energy source 48. The resistors 47, 50, 51 and the actuating electromagnet 46 are connected with the negative pole of the energy source 48 in response to closing of a switch 52' which closes in response to energization of a second actuating electromagnet 52 installed in the delay circuit 42.

The delay circuit 42 comprises a second switching stage which includes three transistors 53, 54, 55. The actuating electromagnet 52 is connected with the collector of the transistor 55 and with one terminal of the detector switch 35 (by way of the conductor 34). The base of the transistor 53 (i.e., the input of the switching stage in the delay circuit 42) is connected with a tap 56a between the capacitor 57 and variable resistor 56 of a timer or R-C link. The tap 56a is further connected with one terminal of a switch 67 which is mechanically coupled to the detector switch 35. The other terminal of the switch 67 is connected with the positive pole of the energy source 48. The switch 35 is open when the switch 67 is closed and vice versa. When the switch 35 is open, the switch 67 shunts the capacitor 57. The emitter of the transistor 53 is connected with the energy source 48 by way of a resistor 59 and with the emitter of the transistor 54 by way of a resistor 58. The base of the transistor 54 is connected with the collector of the transistor 53 and with a resistor 60. The collector of the transistor 54 is connected with a further resistor 61 and with the base of the transistor 55. The actuating electromagnet 52 is connected in the emitter-collector circuit of the transistor 55. The delay circuit 42 is connected with the energy source 48 in response to closing of the detector switch 35 and of a master switch 62 which is in series with the detector switch.

When the actuating electromagnet 46 of the control circuit 40 is energized to close the switch 46', the latter energizes an electromagnet 63 which is in series with an energy source 163 of the output circuit 41. The switch 46' is in parallel with the aforementioned cam-operated switch 38 which is closed by the cam 39 while the control shaft 12 rotates through 180°. Thus, the electromagnet 63 can be energized in response to closing of the switch 46' (energization of the actuating electromagnet 46) and/or in response to closing of the switch 38. The energized electromagnet 63 can pivot an armature 64, here shown as a bell crank, which can close a switch 65 in the circuit of an electric motor 66 for the shaft 29a of the gear 29.

The operation of the projector shown in FIGS. 4 and 5 is as follows:

The master switch 62 is closed and the leading portion 17L of the film 17' in the foremost cassette 7' (which is assumed to occupy the projection position shown in FIG. 4) is threaded through the projector by an automatic mechanism (corresponding to the mechanism 16 of FIG. 1) so that the tip of the leading portion 17L is attached to the core of the takeup reel 9. When the leading portion 17L reaches and closes the detector switch 35, the switches 62, 35 connect the delay circuit 42 of the drive 27 to the energy source 48 and the switch 35 opens the switch 67. After elapse of an interval which is determined by the constant of the R-C link 56, 57 in the delay circuit 42, the switching stage 53–55 completes the circuit of the actuating electromagnet 52 which closes the switch 52' whereby the latter connects the control circuit 40 with the energy source 48. The reason for delayed connection of the control circuit 40 with the energy source 48 is that the light transmissivity of the leading portion 17L is likely to equal that of the trailing portion 17n but the drive 27 should rotate the control shaft 12 through 180° not earlier than when the receiver 32 detects the junction 26 between the main film portion 17f and the trailing portion 17n. Thus, the delay which is determined by the R-C link 56, 57 of the delay circuit 42 is selected in such a way that the leading portion 17L invariably advances beyond the receiver 32 before the switch 52' closes. Consequently, the signals which the receiver 32 transmits to the control circuit 40 can initiate a rotary movement of the shaft 12 through 180 degrees only when the leading and main portions 17L and 17f of the film 17' have advanced beyond the receiver.

As long as the receiver 32 scans the main film portion 17f whose minimum light transmissivity dFu exceeds the light transmissivity dn of the trailing portion 17n, the film 17' permits a relatively strong beam of light to pass from the light source 33, through the main film portion 17f, and to impinge against the receiver 32. Therefore, the resistance of the receiver 32 is low and the potential at the base of the transistor 43 is a positive potential. Consequently, the transistor 43 blocks, the transistor 44 conducts and the potential at the base of the transistor 45 is a positive potential. Therefore, the transistor 45 blocks and prevents energization of the actuating electromagnet 46 so that the switches 46', 65 remain open. The motor 66 is at a standstill. The switch 38 is assumed to be open because its movable contact extends into the adjacent notch 39a of the cam 38 on the control shaft 12.

When the junction 26 moves beyond the receiver 32, the latter receives from the source 33 less light because the light transmissivity dn of the trailing portion 17n is less than the minimum light transmissivity dFu of the main portion 17f. The resistance of the receiver 32 increases and the potential at the base of the transistor 43 is shifted in a negative direction to such an extent that the transistor 43 conducts. The transistor 44 blocks and the transistor 45 conducts to energize the actuating electromagnet 46 which closes the switch 46' in the output circuit 41. The switch 46' completes the circuit of the electromagnet 63 which causes its armature 64 to close the switch 65 and to start the motor 66 which rotates the shaft 12 (arrow 20) by way of the gears 29, 28. The movable contact of the switch 38 is expelled from the notch 39a of the cam 39 so that the latter closes the switch 38 which remains closed until its movable contact enters the notch 39b, i.e., after the control shaft 12 completes one-half of a full revolution. As the control shaft 12 rotates, its shifting devices 25 move the trailing portion 17n of the film 17' laterally and away from the film path whereby the trailing portion 17n permits the detector switch 35 to open. The switch 35 closes the switch 67 and disconnects the delay circuit 42 from the energy source 48. The capacitor 57 discharges in response to closing of the switch 67. The actuating electromagnet 52 is deenergized in response to opening of the switch 35 and opens the switch 52' to disconnect the control circuit 40 from the energy source 48. Consequently, the actuating electromagnet 46 is deenergized and opens the switch 46' but the electromagnet 63 remains energized because the switch 38 remains closed until the control shaft 12 completes its angular movement through 180 degrees. The fact that the receiver 32 is directly exposed to light which issues from the source 33 when the trailing film portion 17n is shifted sideways is of no consequence because the control circuit 40 is disconnected from the energy source 48.

The electromagnet 63 is deenergized in response to opening of the switch 38 by the cam 39 so that the switch 65 in the output circuit 41 opens and arrests the motor 66 at a time when the control shaft 12 completes one-half of a revolution. During its rotation through 180 degrees, the control shaft 12 causes its pinion 24 to advance the tray 23 by a step so that the next-following cassette 7" moves to the projection position while the foremost cassette 7' assumes the rewinding position. The takeup reel 10 changes positions with the takeup reel 9 and is ready to collect the film which is being paid out by the supply reel in the cassette 7".

The actuating electromagnet 46 can be installed in the output of a photosensitive circuit which energizes the electromagnet when its photosensitive element detects the trailing film portion 17n.

It is further clear that the electromagnet 46 can initiate certain other operations. For example, the electromagnet 46 can control a switch which opens the circuit of the light source 3 or 33 as soon as the photosensitive receiver detects the trailing film portion 17n. Furthermore, the electromagnet 46 can cause a shutter or mask to move in front of the lens system 2 or between the lens system and the light source of the projector when the photosensitive receiver detects the trailing portion 17n.

The present invention is based on the recognition that the differences in characteristics of various portions of motion picture film can be utilized to initiate certain operations which take place in automatic response to start and/or termination of transport of satisfactory film frames past the projection gate. Thus, the differences in light transmissivity of the main portion and trailing portion of motion picture film can be detected in order to automatically remove a freshly presented film from a projection position, to automatically place the next-following film into such projection position, to automatically rewind the preceding film during presentation of the next-following film, and/or to initiate certain other operations without necessitating any attention on the part of the user and in such sequence that two or more rolls of film can be presented practically without any interruptions. This is particularly desirable if a complete sequence of scenes or subjects cannot be recorded on a single film so that two or more films should be presented in rapid sequence to avoid undesirable delays upon completed presentation of a film.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is:

1. In a projector for use with cassettes containing convoluted motion picture film, a combination comprising a housing; guide means mounted in said housing and defining a film path along which the film is arranged to move lengthwise from a cassette occupying a projection position on said housing; a pair of takeup reels rotatably supported by said housing so that one thereof occupies a film collecting position in which it can collect the film advancing along said path and that the other reel occupies a film withdrawing position in which the film which is convoluted thereon can be withdrawn to be collected in a cassette occupying a rewinding position; and control means for inverting said reels by simultaneously moving said reels relative to the cassettes occupying said projection and rewinding positions so as to respectively place said one and said other reel into said withdrawing and collection positions.

2. A combination as defined in claim 1, wherein said takeup reels are rotatable in said housing about a common axis and said control means comprises a control member arranged to rotate said takeup reels about a second axis which is normal to said common axis.

3. A combination as defined in claim 2, further comprising drive means operative to rotate said control member through 180°.

4. A combination as defined in claim 3, further comprising means for initiating the operation of said drive means in response to completed presentation of the film which is being advanced along said path.

5. A combination as defined in claim 1, wherein said control means comprises means for moving a cassette from said projection position to said rewinding position simultaneously with the inversion of said takeup reels.

6. A combination as defined in claim 5, wherein said housing is arranged to support a series of cassettes and said control means is arranged to move a next-following cassette to said projection position simultaneously with movement of the preceding cassette from said projection position to said rewinding position.

7. A combination as defined in claim 1, further comprising a magazine movably supported by said housing and a series of cassettes in said magazine, said control means comprising means for advancing said magazine stepwise so as to move a preceding cassette from said projection position to said rewinding position and to place the next-following cassette to said projection position in response to inversion of said takeup reels.

8. A combination as defined in claim 7, wherein said control means comprises a control member which is rotatable through 180° to thereby invert said takeup reels and to simultaneously effect a stepwise advance of said magazine.

9. A combination as defined in claim 7, wherein said means for advancing the magazine comprises a driving portion receiving motion from said control means and a driven portion provided on said magazine and receiving motion from said driving portion.

10. A combination as defined in claim 9, wherein said control means comprises a shaft which is rotatable through angles of 180° to thereby invert said takeup reels and said driving portion comprises a pinion secured to said shaft, said driven portion comprising a toothed rack provided on said magazine and meshing with said pinion.

11. A combination as defined in claim 1, wherein each cassette contains a supply reel and said control means comprises a shaft whose axis is normal to the axes of supply reels in the cassettes occupying said projection and rewinding positions.

12. A combination as defined in claim 1, wherein said control means comprises shifting means for moving a film out of said path in response to inversion of said takeup reels so that a fresh film which is to be collected by the takeup reel occupying said collecting position can be threaded along said path.

13. A combination as defined in claim 1, further comprising film threading means for advancing the film along said path from a cassette in said projection position to the takeup reel in said collecting position.

14. A combination as defined in claim 1, further comprising rewinding means for advancing the film from the takeup reel in said withdrawing position into the cassette occupying said rewinding position.

15. In a projector for use with a plurality of cassettes containing convoluted motion picture film having a main portion of first and a trailing portion of different second light transmissivity, a combination comprising a housing; guide means mounted on said housing and defining a film path along which the film is arranged to move lengthwise from a cassette occupying a projection position on said housing; a pair of takeup reels rotatably supported by said housing; so that one thereof occupies a film collection position in which it can collect the film advancing along said path and that the other reel occupies a film withdrawing position in which the film which is convoluted thereon can be withdrawn to be collected in a cassette occupying a rewinding position; control means for inverting said reels so as to respectively place said one and said other reel into said withdrawing and collecting positions, said control means comprising a control member rotatable through angles of predetermined magnitude to thereby invert said reels; drive means operable to rotate said control member through said angles; and scanning means adjacent to a portion of said path to scan the light transmissivity of film in said portion of said path and arranged to initiate the operation of said drive means in response to detection of said second light transmissivity, and scanning means comprising photosensitive receiver means adjacent to one side and a light source adjacent to the other side of said portion of said path and arranged to direct a light beam in a direction toward said receiver means so that the light beam must pass through the film in said portion of said path.

16. A combination as defined in claim 15, wherein said light source is a projection lamp.

17. In a projector for use with a plurality of cassettes containing convoluted motion picture film having a main portion of greater first and a trailing portion of lesser second light transmissivity a combination comprising a housing; guide means mounted in said housing and defining a path along which the film is arranged to move lengthwise from a cassette occupying a projection position on said housing; a pair of takeup reels rotatably supported by said housing so that one thereof occupies a film collecting position in which it can collect the film advancing along said path and that the other reel occupies a film withdrawing position in which the film which is convoluted thereon can be withdrawn to be collected in a cassette occupying a rewinding position; control means for inverting said reels so as to respectively place said one and said other reel into said withdrawing and collecting positions, said control means comprising a control member rotatable through angles of predetermined magnitude to thereby invert said takeup reels; drive means operable to rotate said control member through said angles; and scanning means adjacent to a portion of said path to scan the light transmissivity of film in said portion and arranged to initiate the operation of said drive means in response to detection of said second transmissivity, said scanning means comprising photosensitive receiver means adjacent to one side and a light source adjacent to the other side of said portion of said path and arranged to direct a light beam in a direction toward said receiver means so that the light beam must pass through the film in said portion of said path, said drive means comprising a control circuit having an input portion connected to said receiver means and an output portion having actuating means arranged to effect rotation of said control member in response to a signal produced by said receiver means on exposure to a light beam passing through the trailing portion of a film in said path.

18. A combination as defined in claim 17, wherein said drive means further comprises an output circuit having motor means for rotating said control member, said actuating means comprising electromagnet means energizable by said receiver means to thereby start said motor means.

19. A combination as defined in claim 17, wherein said control circuit comprises a switching stage connected between said receiver means and said actuating means.

20. A combination as defined in claim 19, wherein said switching stage comprises a plurality of transistors.

21. A combination as defined in claim 17, wherein said drive means further comprises a source of electrical energy and a delay circuit for connecting said control circuit with said source with a predetermined delay following the introduction of a film into said path.

22. A combination as defined in claim 21, wherein said delay circuit comprises a normally open switch which is in series with said source and connects the latter with said control circuit in response to closing thereof, timer means arranged to produce a signal with a predetermined delay following detection of a film in said path, a switching stage in circuit with said timer means, and an electromagnet energizable by said switching stage in response to said signal to thereby close said switch.

23. A combination as defined in claim 22, wherein said timer means comprises an R-C link.

24. A combination as defined in claim 22, further comprising a detector switch adjacent to said path and arranged to connect said delay circuit to said source in response to detection of a film in said path.

25. A combination as defined in claim 18, wherein said output circuit comprises switch means actuated by said control member to arrest said motor means in response to rotation of said control member through said predetermined angle.

26. A combination as defined in claim 25, wherein said control member comprises cam means for actuating said switch means.

* * * * *